United States Patent
King et al.

(10) Patent No.: US 6,804,290 B1
(45) Date of Patent: Oct. 12, 2004

(54) METHOD OF ACQUIRING SIGNAL CODE PHASES AND GEOGRAPHIC POSITIONING RECEIVER

(75) Inventors: Thomas M. King, Tempe, AZ (US); Jeffrey J. Ogren, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/579,931

(22) Filed: May 26, 2000

(51) Int. Cl.[7] .......................... H04B 1/69; H04B 1/707; H04B 1/713

(52) U.S. Cl. ...................... 375/142; 375/134; 375/137; 375/150; 375/147; 375/149

(58) Field of Search ................................ 375/142, 147, 375/150, 137, 134, 316; 342/357.02, 357.09, 378; 701/213

(56) References Cited

U.S. PATENT DOCUMENTS

| | | | |
|---|---|---|---|
| 4,114,155 A | | 9/1978 | Raab |
| 4,426,712 A | | 1/1984 | Gorski-Popeil |
| 5,663,735 A | | 9/1997 | Eshenbach |
| 5,841,396 A | | 11/1998 | Krasner |
| 5,901,171 A | * | 5/1999 | Kohli et al. ................. 375/147 |
| 6,009,118 A | * | 12/1999 | Tiemann et al. ............. 375/150 |
| 6,191,731 B1 | | 2/2001 | McBurney et al. |
| 6,208,290 B1 | | 3/2001 | Krasner |
| 6,208,292 B1 | | 3/2001 | Sih et al. |
| 6,389,291 B1 | | 5/2002 | Pande et al. |
| 6,421,002 B2 | | 7/2002 | Krasner |
| 6,427,120 B1 | | 7/2002 | Garin et al. |
| 6,429,809 B1 | | 8/2002 | Vayanos et al. |
| 6,577,271 B1 | * | 6/2003 | Gronemeyer ................ 342/378 |

OTHER PUBLICATIONS

Holm, E.D. et al. "A GPS Fast Acquisition Reciever." *IEEE 1983 National Telesystems Conference*, Feb. 1983, pp 214–218.

* cited by examiner

Primary Examiner—Stephen Chin
Assistant Examiner—Curtis Odom
(74) Attorney, Agent, or Firm—Brian M. Mancini

(57) ABSTRACT

A method of acquiring signal code phases includes selecting a correlation sum with a greatest magnitude from a set of correlation sums after a predetermined time has elapsed. A geographic positioning receiver performing the method includes two or more memory banks (114, 116, 118, 120) alternating between storing a signal sequence and transmitting the signal sequence to parallel correlators (132, 134) to be correlated against a predetermined pattern sequence for real-time data processing.

38 Claims, 9 Drawing Sheets

100

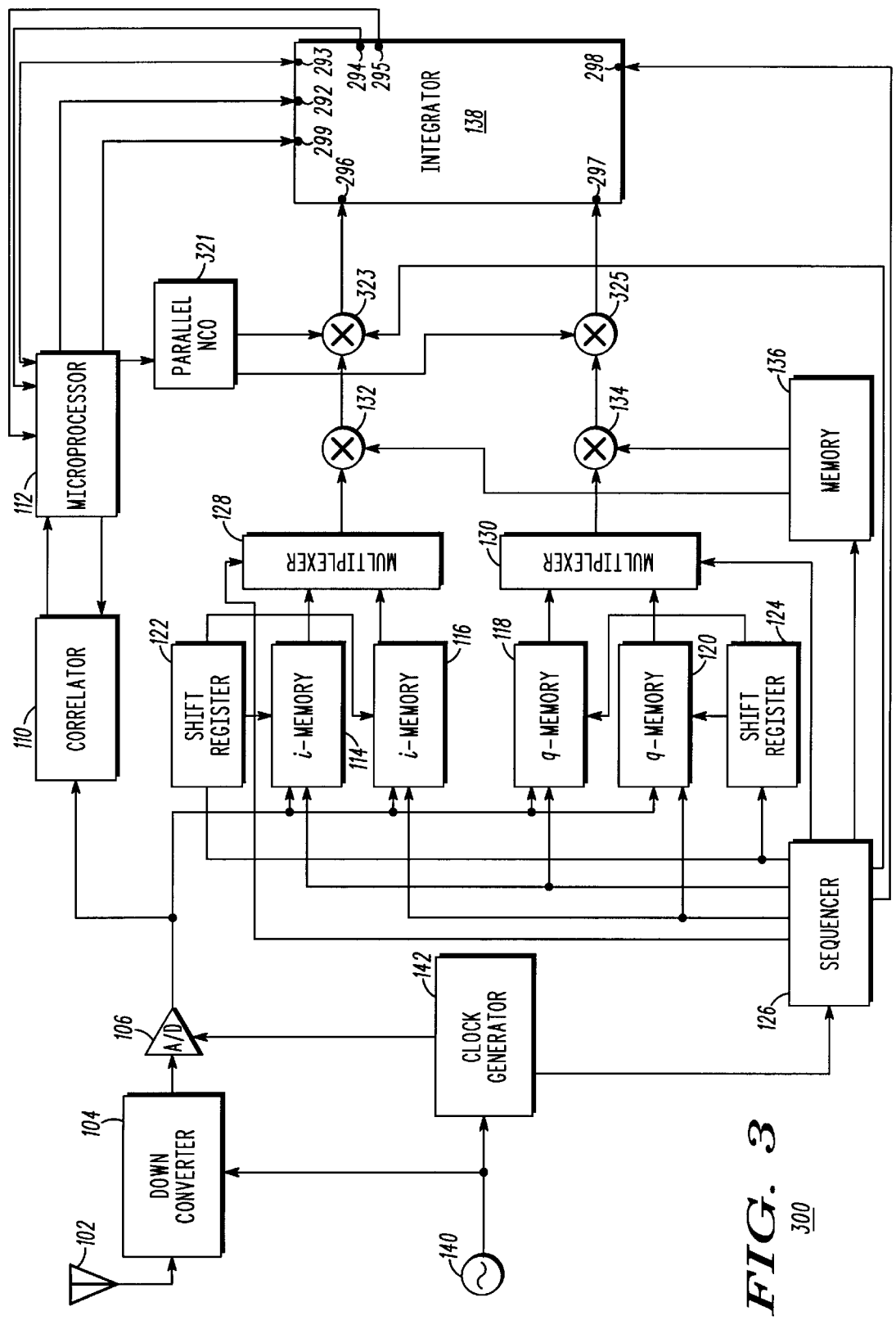
FIG. 3

400

500

600

METHOD OF ACQUIRING SIGNAL CODE PHASES AND GEOGRAPHIC POSITIONING RECEIVER

FIELD OF THE INVENTION

The present invention relates to geographic positioning systems, in general, and to a method and geographic positioning receiver for acquiring signal code phases, in particular.

BACKGROUND OF THE INVENTION

The Global Positioning System (GPS) is a satellite-based system developed by the United States (U.S.) Department of Defense to give accurate positional information to a GPS receiver anywhere in the world. A properly equipped GPS receiver may therefore be used in any setting in which position is desired and typically yields positional coordinates in three dimensions. The GPS system is enabled by a satellite orbital constellation made up of 24 or more satellites orbiting the earth in 12 hour orbits. The satellites are arranged in six orbital planes, each containing four satellites. The orbital planes are spaced sixty degrees apart and are inclined approximately fifty-five degrees from the equatorial plane. This constellation ensures that from four to twelve satellites will be visible at any time at any point on Earth.

The GPS satellites transmit data to be used by GPS receivers. The data includes satellite position data (ephemeris data) and satellite clock correction data. The GPS signal carrying the data includes a carrier signal that is bi-phase modulated with a 1,023 bit long Gold spreading code at a 1.023 MHz chip rate and that is repeated at 0.001 second intervals. The GPS signal is also modulated by data bits at a 50 bits per second (bps) rate and transmitted at a rate of twenty milliseconds per data bit. The 50 bps data includes information for determining a GPS-based time, or a clock time of the GPS satellite, and information for determining geographical location.

Detailed information on the data contained within the GPS signal is available in Interface Control Document ICD-GPS-200, revised in 1991, published by Rockwell International Corporation.

GPS receivers determine a position fix based upon the code phases of GPS signals received from GPS satellites. One specification of a GPS receiver is the time delay from when power is applied to the receiver to when the receiver acquires the satellite signal code phases, computes a position from these code phase measurements, and delivers position coordinates to the user. The time required to accomplish these steps is known as the time-to-first-fix (TTFF). GPS receivers with the shortest TTFF are preferred. The TTFF of any GPS receiver is determined by the individual receiver's own unique hardware and software design.

In battery-powered, hand-held GPS receivers, the TTFF influences total battery life because the receivers must be powered on continuously while the user waits for position coordinates. A GPS receiver with a short TTFF consumes less total energy and has a longer battery life than a GPS receiver with a long TTFF. In addition, when a user is waiting for the first fix, a long TTFF can seem like an eternity.

Furthermore, a car having a GPS receiver may move and change location during a long TTFF. Thus, the position coordinates calculated after the TTFF may be inaccurate. The uncertainty in position may be particularly dangerous if the position coordinates are intended to be used in an emergency, such as in a system for identifying the location of an accident.

There have been many attempts to solve this problem in the past. All of these prior solutions attempt to decrease the signal search time by increasing the number of parallel search bins that can be tested simultaneously. For example, U.S. Pat. No. 5,600,670 (Turney) teaches the concept of speeding the search for a particular satellite by using multiple hardware channels. In order to search for a particular satellite in parallel, some channels are slaved to a main channel. The slave channels test successively delayed versions of a pseudo-noise (PN) code for the satellite, and each channel tests a particular PN code delay. Not all of the possible delays can be tested at once. Alternately, the Turney design can simply assign particular segments of the code phase or Doppler space to alternate channels so as to search the space in parallel.

As another example, U.S. Pat. No. 5,901,171 (Kohli) teaches the concept of time slicing the correlation process to implement a parallel correlator. In the Kohli design, only 22 half chip delays are tested per channel, and when combined with the 12 parallel channels, the design is capable of testing 264 possible code phase delays (assuming all 12 channels are used to search for the same channel). Kohli's idea segments the 0.001 second repeating 1,023 chip long PN code into 11 chip segments, and each successive segment is then processed. It takes 186 total segments processed to equal one code repeat interval of 0.001 seconds. Furthermore, in the Kohli design, each segment, when stored, is applied to a number of channels. The channel processing for all channels occurs on one of the segments. The segment is then discarded and another segment is collected. Only 1 segment is kept while it is being processed.

As a further example, U.S. Pat. No. 6,009,118 (Tiemann) teaches the concept of a brute force parallel correlator. In this design, 2046 parallel correlators are used, and no time slicing of the signal processing occurs. In order to implement a 2046 state parallel correlator, much additional hardware is used.

Therefore, a need exists for an efficient method of acquiring signal code phases and a geographic positioning receiver that minimizes the TTFF, extends battery life, and provides more accuracy in determining position coordinates.

SUMMARY OF THE INVENTION

The present provides a geographic positioning receiver and a method of acquiring signal code phases in a geographic positioning receiver. A novel aspect of the present invention includes providing a geographic positioning receiver with: a memory with at least three portions, a correlator with an adder coupled thereto, and a comparator, a microprocessor, a mixer, and a numerically controlled oscillator coupled to each other and the memory. One step in acquiring signal code phases includes providing a predetermined pattern sequence receiving a first signal sequence. Another step includes storing the first signal sequence in a first memory portion and storing the predetermined pattern sequence in a second memory portion. Another step includes comparing the first signal sequence and the predetermined pattern sequence in the correlator. Another step includes generating correlation values. Another step includes adding the correlation values from the correlator into correlation sums in the adder. Another step includes storing the correlation sums from the adder in a third memory portion. Another step includes selecting by the comparator from the third memory portion a final correlation sum with a greatest magnitude from the correlation sums. Another step includes determining a code phase for the first signal sequence from the final correlation sum.

BRIEF DESCRIPTION OF THE DRAWINGS

The invention will be better understood from a reading of the following detailed description taken in conjunction with the accompanying drawing figures, in which like reference indicators are used to designate like elements, and in which:

FIGS. 3 through 6 illustrate block diagrams of different geographic positioning receivers in accordance with different embodiments of the invention.

DETAILED DESCRIPTION OF THE DRAWINGS

Figure 1:
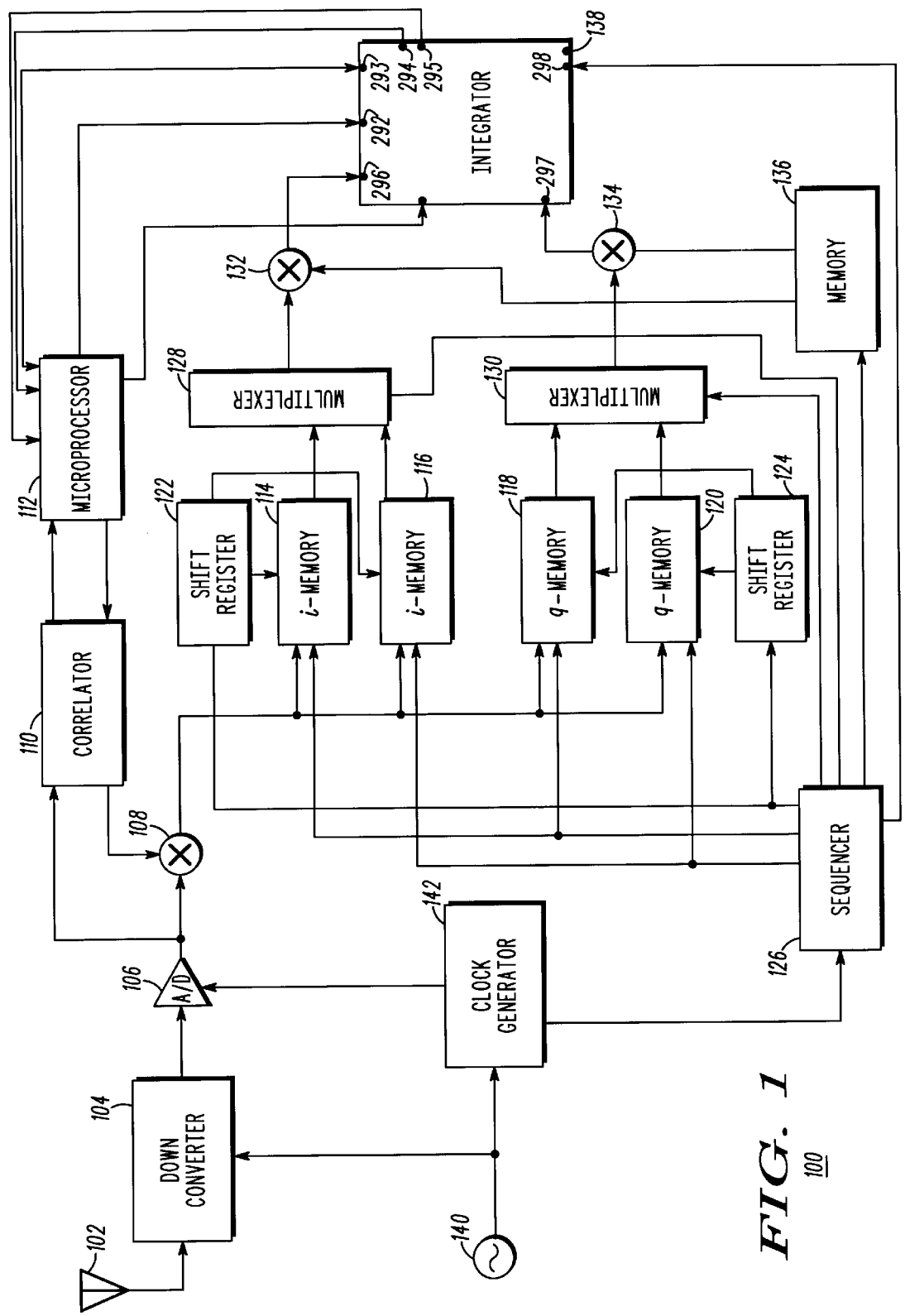
FIGS. 1 and 2 illustrate block diagrams of a geographic positioning receiver in accordance with an embodiment of the invention.

FIG. 1 illustrates a block diagram of a geographic positioning receiver 100. In the preferred embodiment, geographic positioning receiver 100 is a GPS receiver. Geographic positioning receiver 100 includes an antenna 102 coupled to a down converter 104. In the preferred embodiment, down converter 104 is a conventional GPS down converter. Down converter 104 is coupled to an analog to digital converter (A/D converter) 106. A/D converter 106 is preferably either a one-bit or two-bit A/D converter. More than two bits can be used, but the processing operations are the same. In the descriptions that follow, the discussion is limited to a description of a one-bit A/D converter implementation, but it is well understood in the art that multi-bit A/D converters can be used. A reference oscillator 140 is coupled to down converter 104 and to a clock generator 142, and clock generator 142 is coupled to A/D converter 106. A/D converter 106 is coupled to a mixer 108. In the preferred embodiment, mixer 108 is coupled to memory banks 114, 116, 118, 120. Two memory banks 114, 116 alternately store in-phase components of a received signal sequence, and two memory banks 118, 120 alternately store quadrature components of the signal sequence. In the preferred embodiment, memory banks 114, 116, 118, 120 are random access memories (RAM), and each contains a data bus width of 128 bits or wider. Again, this description is directed towards a one-bit A/D converter implementation, in which the bus width of each of memory banks 114, 116, 118, 120 is 128 bits. In an embodiment of a two bit or more A/D converter, the bus width would be 128 samples wide, in which each sample represents the number of bits of processing carried forward from the A/D converter subsystem and its associated A/D output gain and scaling functions. In general, a multi-bit implementation would carry forward more than one data bit per sample into memory banks 114, 116, 118, and 120, and this multi-bit implementation either widens the bus a corresponding amount or causes parallel memory to be added to carry the additional bits. Memory banks 114, 116 are coupled to a shift register 122, and memory banks 118, 120 are coupled to a shift register 124. Memory banks 114, 116 are also coupled to a 128-sample wide parallel correlator 132 via multiplexer 128, and memory banks 118, 120 are also coupled to 128-sample wide parallel correlator 134 via multiplexer 130. Parallel correlators 132, 134 are coupled to an integrator 138 that is discussed in FIG. 2.

Geographic positioning receiver 100 also includes the following supporting components: a conventional parallel channel GPS correlator 110 coupled to A/D converter 106 and mixer 108, a controlling microprocessor 112 coupled to correlator 110 and integrator 138, a controller/memory sequencer 126 coupled to clock generator 142, shift registers 122, 124, and memory banks 114, 116, 118, 120, and a PN code memory bank 136 coupled to sequencer 126 and correlators 132, 134. Conventional parallel channel GPS correlator 110 supplies a numerically controlled oscillator (NCO) output to mixer 108. PN code memory bank 136 is preferably a read-only memory containing a predetermined pattern sequence to be compared with a signal sequence received by geographic positioning receiver 100.

Geographic positioning receiver 100 operates in the following manner to receive a GPS signal, to determine a code phase of the GPS signal, and to determine a signal-to-noise ratio of the GPS signal. Antenna 102 receives downlink data in the form of an analog signal sequence from a positioning system. In the preferred embodiment, the positioning system is a global positioning system, and the signal sequence is a GPS signal received from a GPS satellite. The GPS satellite preferably transmits the analog signal sequence at a spectrum of plus or minus 1.023 Megahertz (MHz) around a center frequency of 1575.42 MHz. Down converter 104 receives the analog signal sequence from antenna 102 and translates a high frequency of the signal sequence down to an intermediate frequency (IF). A/D converter 106 samples the signal sequence from down converter 104 at a rate that is preferably greater than 2.046 MHz. A/D converter 106 converts the analog signal sequence into a digital signal sequence. Mixer 108 receives the digital signal sequence from A/D converter 106 and uses the NCO output from parallel channel GPS correlator 110 to tune the receiver to a desired frequency of one of the satellites from the digital signal sequence. The desired frequency corresponds to the Doppler frequency of the satellites and any offset frequency due to the reference oscillator in the receiver.

Mixer 108 passes in-phase and quadrature components of the filtered signal sequence into memory banks 114, 118, or memory banks 116, 120. For example, mixer 108 outputs a first sample of the in-phase component of the signal sequence to memory bank 114, and then mixer 108 passes a first sample of the quadrature component of the signal sequence to memory bank 118. Next, mixer 108 passes a second sample of the in-phase component of the signal sequence to memory bank 114, and then mixer 108 passes a second sample of the quadrature component of the signal sequence to memory bank 118. In the preferred embodiment, the first and second samples of the in-phase and quadrature components of the signal sequence represent the first and second bits of the in-phase and quadrature components of the signal sequence. The subsequent bits of the in-phase and quadrature components of the signal sequence are similarly stored in this alternating manner into memory banks 114 and 118. In the preferred embodiment, the in-phase and quadrature components of the signal sequence are each comprised of N*2,046 samples, where N is a small integer preferably greater than or equal to one and preferably less than or equal to twenty. The number twenty, representing twenty milliseconds, is chosen because it corresponds to the time it takes to transmit one data bit of the 50 bit per second data sequence from the GPS satellite. Sequencer 126 controls memory banks 114, 116, 118, 120 such that memory banks 114, 118 for in-phase and quadrature, respectively, may each receive and store the new signal sequence while the signal sequence stored in memory banks 116, 120 for in-phase and quadrature, respectively, is being processed. Similarly, memory banks 116, 120 may receive and store a new signal sequence while the signal sequence stored in memory banks 114, 118 is being processed. The alternating processing and storing ability of memory banks 114, 118 and memory banks 116, 120 allows the signal processing function described hereinafter to keep up with the real-time data collection process. In the preferred embodiment, memory banks 114, 118 and memory banks 116, 120 alternately process and store signal sequences at N*0.001 second intervals.

After the in-phase and quadrature components of the entire signal sequence are stored in memory banks 114, 118, the in-phase and quadrature components of a new signal sequence are stored in memory banks 116, 120. While the new signal sequence is being stored in memory banks 116, 120, memory bank 114 passes the in-phase component of the signal sequence in 128-sample long segments to parallel correlator 132 via multiplexer 128. Simultaneously, memory bank 118 passes the quadrature component of the signal sequence in 128-sample long segments to parallel correlator 134 via multiplexer 130. In this manner, the in-phase and quadrature components of the signal sequence are each divided into 16 segments, or words, each of which are comprised of 128 samples. In the preferred embodiment, each sample corresponds to a single bit.

Parallel correlators 132, 134 also receive an in-phase component input from PN code memory bank 136. PN code memory bank 136 contains replica PN code bits of in-phase components of a predetermined PN pattern sequence in the same segmented format as the in-phase and quadrature components of the signal sequence in memory banks 114, 118. Parallel correlators 132, 134 each preferably contain a bank of 128 exclusive-or gates followed by an adder (for a one-bit per sample implementation), or a hardware-based multi-bit per sample parallel correlator as described in the paper "Real-Time Missile Tracking with GPS", by Laurence L. Wells, published in the proceedings of the Institute of Navigation Aerospace Meeting, April, 1981.

In a one-bit per sample implementation, correlator 132 compares bit zero of the first segment of the in-phase component of the signal sequence in memory banks 114 to bit zero of the first segment of the in-phase component of the predetermined pattern sequence in PN code memory bank 136, while simultaneously comparing bit one of the first segment of the in-phase component of the signal sequence in memory bank 114 to bit one of the first segment of the in-phase component of the predetermined pattern sequence in PN code memory bank 136 and while simultaneously comparing bit two of the first segment of the in-phase component of the signal sequence in memory bank 114 to bit two of the first segment of the in-phase component of the predetermined pattern sequence in PN code memory bank 136, and so on through bit one hundred and twenty-seven. Similarly, correlator 134 simultaneously compares bit zero of the first segment of the quadrature component of the predetermined pattern sequence in memory bank 118 to bit zero of the first segment of the in-phase component of the signal sequence in PN code memory bank 136, while simultaneously comparing bit one of the first segment of the quadrature component of the signal sequence in memory bank 118 to bit one of the first segment of the in-phase component of the predetermined pattern sequence in PN code memory bank 136 and while simultaneously comparing bit two of the first segment of the quadrature component of the signal sequence in first memory bank 118 to bit two of the first segment of the in-phase component of the signal sequence in PN code memory bank 136, and so on through bit one hundred and twenty-seven.

Correlators 132, 134 each contains an adder that adds one to a running count for each exclusive-or output of zero when the two compared bits match. Each of the adders also subtracts one from the running count for each exclusive-or output of one when the two compared bits do not match. Correlators 132, 134 each provides an 8-bit output comprised of 7 bits for the running count of the compared segment and 1 bit for a positive or negative sign of the running count. The 8-bit outputs of correlators 132, 134 are referred to as correlation values. Parallel correlators 132, 134 send the correlation values to nodes 296 and 297, respectively, of integrator 138.

Figure 2:
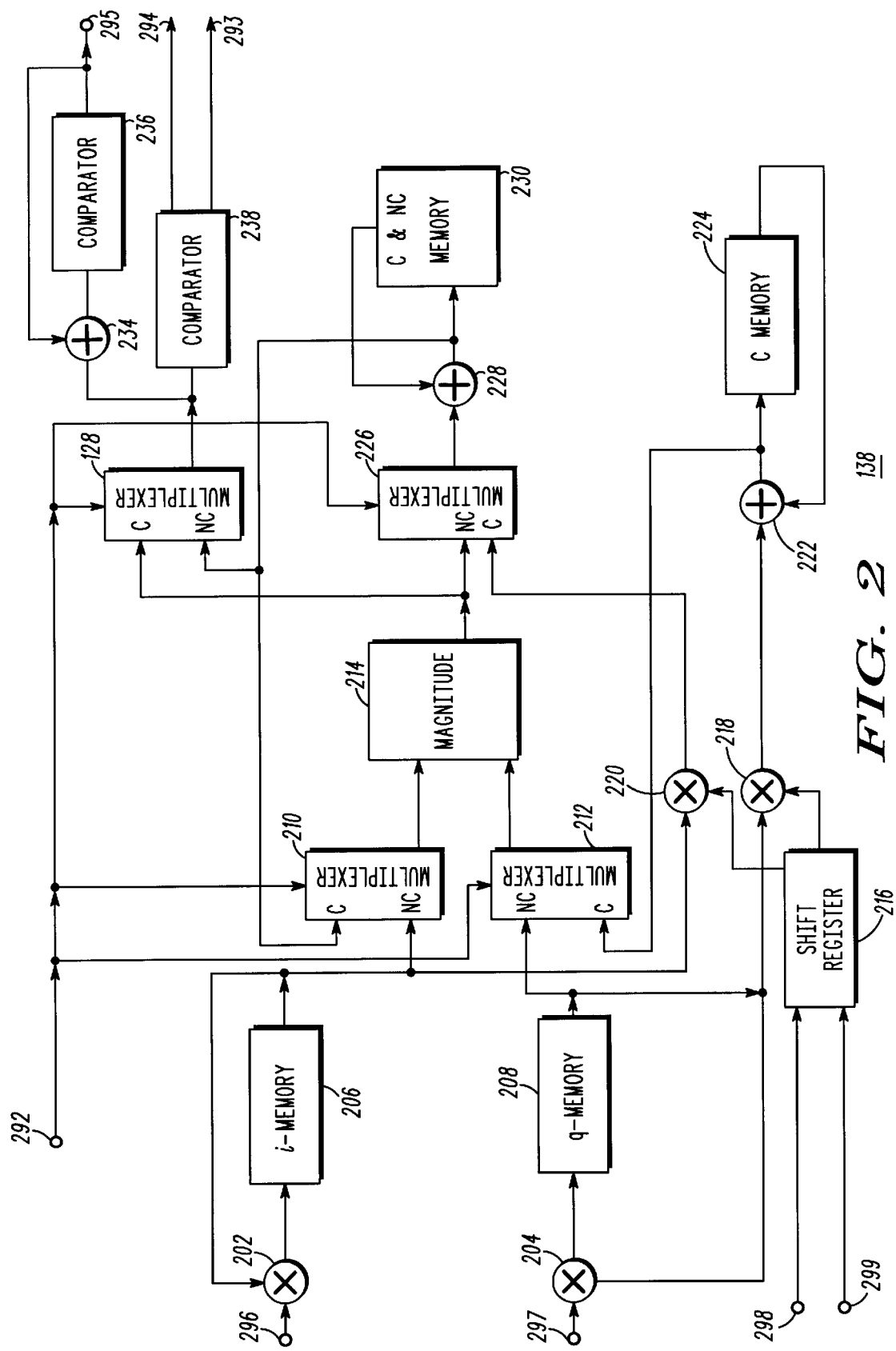

FIG. 2 illustrates a block diagram of integrator 138. The following operation of integrator 138 is referred to as the non-coherent mode. However, integrator 138 can operate in a fully coherent integration mode, a non-coherent integration mode, or a mixed set of coherent and non-coherent integration modes. The non-coherent mode is described first, and the other modes are described later.

First, the correlation value for the first segment of the in-phase component of the signal sequence from parallel correlator 132 (FIG. 1) passes from node 296 to an adder 202. Adder 202 adds zero to the correlation value and stores the correlation value at a first address within a memory 206. In the preferred embodiment, memory 206 is a random access memory. Subsequently, correlator 132 (FIG. 1) receives the second segment of the in-phase component of the signal sequence from memory bank 114 (FIG. 1) and compares this segment with the second segment of the in-phase component of the predetermined pattern sequence from PN code memory bank 136 (FIG. 1). Correlator 132 (FIG. 1) outputs the correlation value for the comparison of this second segment and sends the correlation value to adder 202 via node 296. Memory 206 sends the earlier correlation value for the comparison of the first segment back to adder 202, which adds the two correlation values together to form a correlation sum. Adder 202 outputs the correlation sum to memory 206, which stores the correlation sum at the first address. Similarly, the correlation value for the third segment of the in-phase component of the signal sequence is added to the correlation sum and stored in the first address of memory 206. This process continues until all 16 correlation values for all 16 segments are added together and stored as a single correlation sum in the first address of memory 206. Simultaneously, a correlation sum for the quadrature component of the signal sequence is calculated and stored at a first address of memory 208. In the preferred embodiment, memory 208 is also a random access memory.

Next, referring back to FIG. 1, shift register 122 shifts the in-phase component of the signal sequence in memory bank 114 by one sample, which is preferably a single bit. After the one-sample shifting process, the first sample of the in-phase component of the unshifted or original signal sequence becomes the last sample in the one-sample shifted signal sequence, and the second sample of the in-phase component of the unshifted or original signal sequence becomes the first sample of the one-sample shifted signal sequence, and the third sample of the in-phase component of the unshifted or original signal sequence becomes the second sample of the one-sample shifted signal sequence, and so on. This one-sample shifted signal sequence in memory bank 114 is also divided into 16 segments, each of which is comprised of 128 samples. Correlator 132 compares each of these new segments to the segments of the unshifted predetermined pattern sequence stored in PN code memory bank 136. The correlation values of each segment comparison are summed together and stored at a second address of memory 206 (FIG. 2) in integrator 138.

Similarly, shift register 124 shifts the quadrature component of the signal sequence stored in memory bank 118 by one sample, which is also preferably a single bit. Correlator 134 compares the 16 segments of this one-sample shifted signal sequence to the 16 segments of the unshifted predetermined pattern sequence stored in PN code memory bank 136. The correlation values of correlator 134 are added together to create a correlation sum that is stored at a second address of memory 208 (FIG. 2) in integrator 138.

The signal sequence stored in memory banks 114 and 118 is additionally shifted one sample at a time until the signal sequence in memory banks 114 and 118 is shifted back to their original zero-sample shifted, or unshifted, sequences. The correlation sums for each of the shifted signal sequences are stored in different addresses within memories 206, 208 (FIG. 2) in integrator 138. In the preferred embodiment, receiver 100 shifts the signal sequence in memory banks 114, 118 back to its original unshifted sequence within the time it takes to store a new signal sequence in memory banks 116, 120. If memory banks 114, 116, 118, and 120 each can store 0.001 seconds of sample memory, then the correlation process of testing all 2046 possible sample shifted sequences is completed in less than 0.001 seconds, typically in about 0.82 milliseconds.

The process of slicing the 2046 possible delay PN sequences into sixteen 128 sample segments (with two empty slots at the end) and operating on the 128 sample segments serially one at a time provides flexibility in processing order. As described earlier, there is sufficient processing time to compute the correlation value for all 2046 possible delays of the PN sequence given that sixteen serial trials of each of the 128 segments needs to be tested and summed into memories 206, 208 and memory 230 (described hereinafter). To test all 2046 delays, there needs to be 16 times 2046 tests of the 128 sample segments where each test corresponds to one of the possible PN sequence delays thereby producing 32,736 total 128 sample segments tested. In order to complete 2046 code delay tests within 0.001 seconds, the 128 sample segments must be tested at a rate greater than 32.736 Mega-segments per second, which is certainly within the possibility of today's microelectronics.

It is also possible to only test a portion of the PN sequence. In some cases it is not required to test all 2046 possible delays as the receiver may have prior knowledge as to the approximate code phase delay of the signal. Refer to U.S. Pat. No. 5,893,044 (King and Ogren) as an example of a method of knowing the approximate code phase delay of the received signal by knowledge of time to less than 0.001 second accuracy in the receiver. In such a system in which time is known or in which the code phase delay of the various satellite signals is known a-priori, receiver 100 can be used to compute a shortened code phase delay test by only computing correlation sums corresponding to the possible range of delays of the PN sequence. Receiver 100 would then only require summing the correlation sums for those possible delays that correspond to the particular address range within the memory elements 206, 208, and 230. In a shortened code phase search test, the processing time within 1 millisecond that is left over can be used to search the signal for other satellite codes at shortened code phase search ranges or for the same satellite code at different Doppler frequencies. In this manner, a highly flexible architecture is created to maximize the signal search potential via iterative trials in the search dimensions of satellite ID, code phase, and Doppler frequency search.

As mentioned earlier, a particular embodiment of the invention can compute all correlation sums for all possible PN code delays within 0.82 milliseconds. In order to continue the processing after this 0.82 ms period, memory 206 sends the correlation sum located at its first address, which represents the in-phase component of the zero-sample shifted, or unshifted, signal sequence, to a magnitude component 214 via multiplexer 210. Simultaneously, memory 208 sends the correlation sum located at its first address, which represents the quadrature component of the zero-sample shifted signal sequence, to magnitude component 214 via multiplexer 212. Magnitude component 214 preferably determines a magnitude of the correlation of the zero-sample shifted signal sequence by computing the sum of the squares of the correlation sums for the in-phase and quadrature components of the zero-sample shifted signal sequence. This magnitude is a magnitude-squares. Alternatively, magnitude component 214 can determine a magnitude of the correlation of the zero-sample shifted signal sequence by computing a quantity related to the square root of the sum of the squares of the correlation sums for the in-phase and quadrature components of the zero-sample shifted signal sequence, or an approximation thereof. This magnitude is an absolute value. The term "magnitude" can take on the meaning of absolute value or magnitude squared. Magnitude component 214 outputs this magnitude to memory 230 via multiplexer 226 and adder 228. Adder 228 adds zero to the magnitude. Memory 230 stores the magnitude of the correlation of the zero-sample shifted signal sequence at its first address.

Next, memory 206 sends the correlation sum stored at its second address, which represents the in-phase component of the one-sample shifted signal sequence, to magnitude component 214 via multiplexer 210, and memory 208 sends the correlation sum stored at its second address, which represents the quadrature component of the one-sample shifted signal sequence, to magnitude component 214 via multiplexer 212. Magnitude component 214 calculates the magnitude-squares of the correlation of the one-sample shifted signal sequence by calculating the sum of the squares of the correlation sums of the in-phase and quadrature components of the one-sample shifted signal sequence. Magnitude component 214 outputs this magnitude-squares to memory 230 via multiplexer 226 and adder 228. Memory 230 stores the magnitude of the correlation of the one-sample shifted signal sequence at its second address. Similarly, the magnitude-squares for the remaining shifted signal sequences are calculated and stored in memory 230. Accordingly, when the signal sequence has 16 segments, each comprised of 128 bits, memory 230 stores 2,046 magnitude-squares at 2,046 different addresses. Each address corresponds to a half-chip delay test of the PN code, covering the 2046 possible delays of the PN code test sequence.

As each of the correlation sums stored in memories 206 and 208 are sent to magnitude component 214, memories 206 and 208 delete those correlation sums from those addresses within memories 206 and 208. Accordingly, at the end of the 0.82 ms period for filling memories 206 and 208 and after memory 230 is filled, memories 206 and 208 can be filled with a new set of correlation sums determined from the in-phase and quadrature components of a new signal sequences stored in memory banks 116, 120 (FIG. 1). Memories 206 and 208 are filled and emptied preferably within 1 ms.

While memories 206, 208 are being filled and emptied, memory banks 116, 120 (FIG. 1) are filled with in-phase and quadrature components of a new signal sequence. After memories 206, 208 are filled with the new set of correlation sums from the in-phase and quadrature components of the new signal sequence from memory banks 116, 120, the magnitude-squares of those new correlation sums are calculated by magnitude component 214 and are stored in memory 230. The magnitude-squares of the new zero-sample shifted signal sequence is first sent to adder 228, and the magnitude-squares of the previous zero-sample shifted signal sequence stored at the first address within memory 230 is also sent to adder 228. Adder 228 adds the magnitude-squares together, and the resulting sum is stored at the first address in memory 230. Similarly, the magnitude-squares of the new one-sample shifted signal sequence is determined by magnitude component 214 and sent to adder 228. Memory 230 sends the previous one-sample shifted signal sequence stored at the second address in memory 230 to adder 228. Adder 228 adds the magnitude-squares together, and memory 230 stores the resulting sum at the second address of memory 230. This process continues until the magnitude-squares of the new 2,047-sample shifted signal sequence is calculated by magnitude component 214 and added to the magnitude-squares of the previous 2,047-sample shifted signal sequence and stored at the 2,046th address in memory 230. In the preferred embodiment, receiver 100 has taken another 1 ms to complete these steps. At this point in time, the new set of correlation sums stored in memories 206 and 208 has been deleted.

The architecture of integrator 138 in receiver 100 allows for maximum flexibility in the number of milliseconds of coherent integration and non-coherent integration. The process of integrating data into memories 206 and 208 is called coherent integration, while the process of computing the signal magnitude squares and further integrating the data is called non-coherent integration. Even though the description up to this point has focused on a 1 millisecond coherent integration period followed by some longer M millisecond non-coherent integration period, it is possible to allow the coherent integration interval to be greater than 1 millisecond using the architecture described. It is well known in the art that additional signal processing gain is achieved by longer than 1 millisecond coherent integration, thus there is a benefit for having a programmable flexibility into the coherent and non-coherent integration periods. For example, in order to implement a ten millisecond coherent integration period, ten successive milliseconds of signal samples are processed in series, summing coherently all of the 1 millisecond correlation sums into memories 206 and 208 respectively. At the end of the last ten millisecond summation, (which completes in less than 1 millisecond as described earlier), the non-coherent integration process is then executed one time, computing the magnitude-squares of all of the samples stored in memories 206 and 208 and summing these magnitude-squares into the corresponding memory locations in memory 230.

Next, memories 206 and 208 are refilled with another new set of coherent correlation sums obtained from in-phase and quadrature components of another new signal sequence stored in memory banks 114, 118. The process of determining magnitude-squares of the correlations is repeated and added to the existing magnitude-squares in memory 230. This process of adding new magnitude-squares to memory 230 is repeated continuously until an expiration of a predetermined period of time. In the preferred embodiment, this predetermined period of time is a function of the desired signal detection level.

At the end of this predetermined period of time, receiver 100 stops receiving additional signal sequences through antenna 102 and stops storing the new signal sequences in memory banks 114, 118 and memory banks 116, 120. At this point in time, memory 230 outputs the summed magnitude-squares at each of its 2,046 addresses to adder 228, and adder 228 outputs these summed magnitude-squares to a multiplexer 232. Microprocessor 112 controls the operation of multiplexers 210, 212, 226, 232 via a node 292.

Multiplexer 232 transmits these summed magnitude-squares to a comparator 238. Comparator 238 compares the summed magnitude-squares at each of the addresses of memory 230 and identifies the largest summed magnitude-squares and its address location within memory 230. Comparator 238 outputs the largest summed magnitude-squares to microprocessor 112 (FIG. 1) via a node 293. Comparator 238 also outputs the address in memory 230 of this largest summed magnitude-squares to microprocessor 112 (FIG. 1) via a node 294. The address of the largest summed magnitude-squares indicates the code phase of the received signal sequence and is used to determine the location of receiver 100.

Multiplexer 232 also transmits the summed magnitude-squares to an adder 234. Adder 234 transmits the summed magnitude-squares to register 236. Adder 234 and register 236 cooperate to add together all of the summed magnitude-squares. Register 236 outputs the total of the summed magnitude-squares to microprocessor 112 (FIG. 1) via a node 295. This total of the summed magnitude-squares approximates the noise level within the signal sequences received by receiver 100 and is used to calculate a signal-to-noise ratio of the received signal sequences.

Receiver 100 is different from the Turney design described previously in the background because, in receiver 100, all possible delays of the PN code are tested within one repetition of the satellite PN code signal.

Receiver 100 is also different from the Kohli design described previously in the background because, in receiver 100, none of the segments are discarded until all the segments making up the 0.001 second repeating code sample have been processed. Furthermore, receiver 100 segments the 0.001 second code segment into 128 or 256 chip long segments where 16 or 8 segments equals the 0.001 second repeating 1,023 chip long PN code. In the Kohli design, only one of the segments is stored and processed at a time. The data being processed in any particular segment is at most 11 half-chip delays old. In receiver 100, the entire 0.001 second repeating 1,023 chip long sequence is stored before being segmented and processed, testing all possible delays. The data being processed in any particular segment is between 128 and 2046 half-chip delays old. This allows flexibility in the order in which the data is processed and also allows for only data segments that are of interest to be processed. For example, if knowledge of the approximate delay of the signal is known, only the delays of interest need to be processed, thus saving power and processing cycles.

Receiver 100 is also different from the Tiemann design described previously in the background because, in receiver 100, the time slicing function allows for sharing of the same hardware elements over time, accomplishing the same work of a flash parallel correlator with reduced circuitry.

FIG. 3 illustrates a block diagram of a geographic positioning receiver 300, which is another embodiment of a geographic positioning receiver. Geographic positioning receiver 300 is similar to geographic positioning receiver 100 (FIG. 1), except that microprocessor 112 in receiver 300 is coupled to a separate and distinct parallel NCO 321, which in turn is coupled to mixers 323, 325 located between parallel correlators 132, 134 and integrator 138. The purpose of parallel NCO 321 is used to generate the Doppler shift for each specific satellite and to remove the Doppler frequency from the correlation of the signal sequence. In this embodiment, the Doppler signal signature on the signal is not removed until after the signal sequence is compared with the predetermined pattern sequence.

Figure 4:
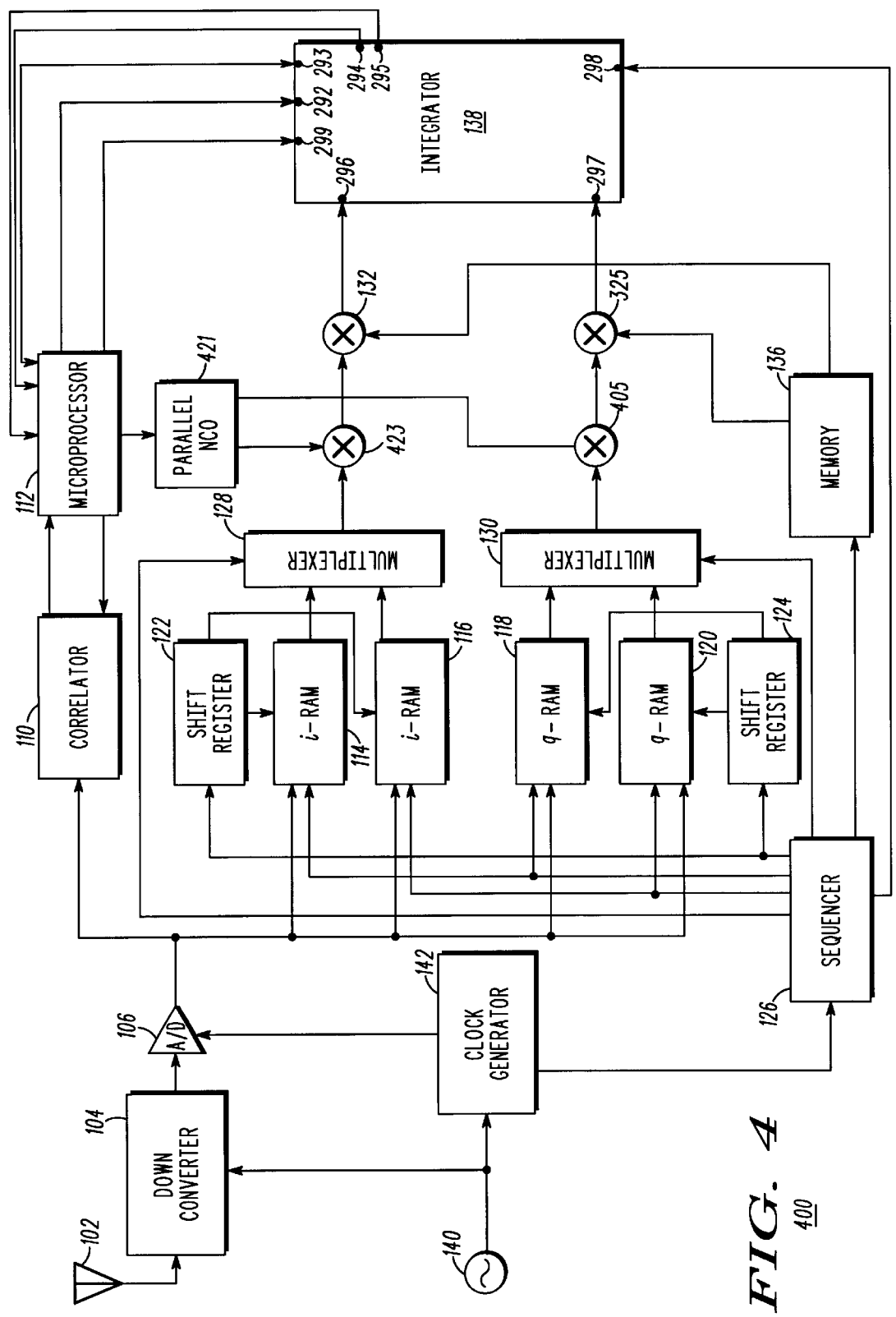

FIG. 4 illustrates a block diagram of a geographic positioning receiver 400, which is a further embodiment of a geographic positioning receiver. Geographic positioning receiver 400 is similar to geographic positioning receiver 300 (FIG. 3), except that microprocessor 112 in receiver 400 is coupled to a parallel NCO 421, which in turn is coupled to mixers 423, 425 located between multiplexers 128, 130 and parallel correlators 132, 134. In this embodiment, the Doppler signal signature on the signal is not removed until after passing through in-phase and quadrature memory banks 114, 118, or in-phase and quadrature memory banks 116, 120, and multiplexers 128, 130, but before passing through parallel correlators 132, 134.

Figure 5:
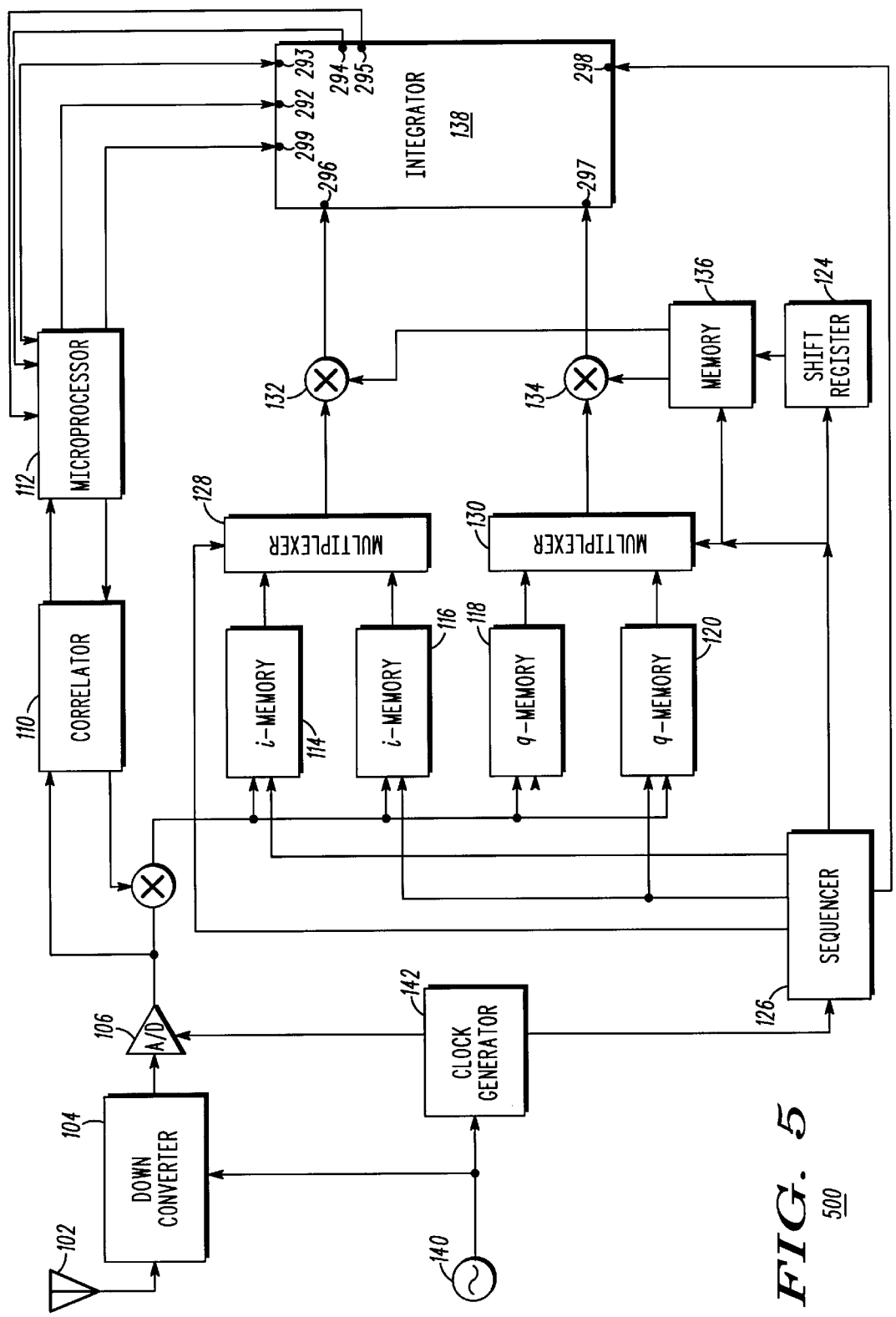

FIG. 5 illustrates a block diagram of a geographic positioning receiver 500, which is another embodiment of a geographic positioning receiver. Geographic positioning receiver 500 is similar to geographic positioning receiver 100 (FIG. 1), except that in geographic positioning receiver 500, the output from memory banks 114, 118 and memory banks 116, 120 remains static while the predetermined pattern sequence of PN code memory bank 136 is shifted one bit at a time to determine the correlation values for each of the segments of the in-phase and quadrature components of the signal sequence. In this embodiment, the architecture of geographic positioning receiver 500 remains the same as the architecture of geographic positioning receiver 100 (FIG. 1) with the exception that shift registers 122, 124 (FIG. 1) are eliminated, and shift register 524 (FIG. 5) is added and coupled to PN code memory bank 136 (FIG. 5) and sequencer 126. This embodiment could also be implemented with a separate and distinct parallel NCO (not shown in FIG. 5) coupled to a mixer (not shown in FIG. 5) located between parallel correlators 132, 134 and integrator 138, similar to that described with respect to FIG. 3. Alternatively, this embodiment could be implemented with a separate and distinct parallel NCO (not shown in FIG. 5) coupled to a mixer (not shown in FIG. 5) located between multiplexers 128, 130 and parallel correlators 132, 134, similar to that described with respect to FIG. 4.

Figure 6:
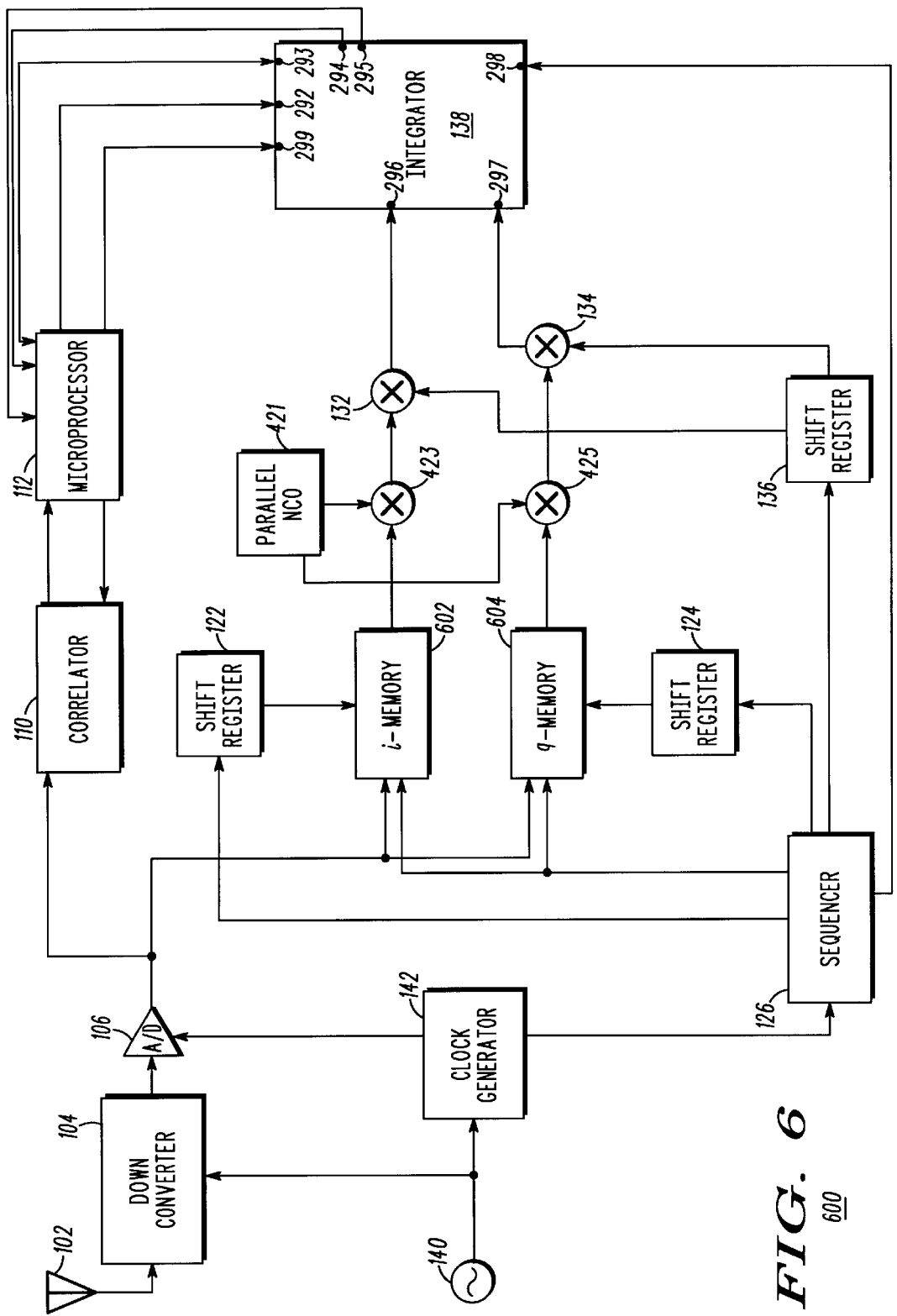

FIG. 6 illustrates a block diagram of a geographic positioning receiver 600 which is another geographic positioning receiver for determining position coordinates. Geographic positioning receiver 600 is similar to geographic positioning receiver 400 (FIG. 4), but portions of receiver 600 operate in a static mode and not in real time.

Geographic positioning receiver 600 is comprised of burst sequential memories 602, 604 in place of memory banks 114, 116, 118, 120 (FIG. 4) in geographic positioning receiver 400 (FIG. 4). Burst sequential memories 602, 604 are large enough to store or sample as many signal sequences as necessary to permit receiver 600 to obtain a very accurate pseudo-range measurement by finding the maximum magnitude in integrator 138. The long sample time available with burst sequential memories 602, 604 removes the need for real-time data processing and allows the receiver to determine the code phases and Doppler shifts of many simultaneously received satellites by sequentially processing each desired satellite from the same signal sample.

Antenna 102 receives signal sequences and transmits the signal sequences through down converter 104 and A/D converter 106 to be stored in memories 602, 604. Once memories 602, 604 are full, geographic positioning receiver 600 may take as long as necessary to find the maximum magnitude of the correlations from all of the signal sequences in memories 602, 604. After filling memories 602, 604 with the in-phase and quadrature components of the signal sequences, the front-end of geographic positioning receiver 600 comprised of antenna 102, down converter 104, and A/D converter 106 is turned off to conserve power. Then, burst sequential memories 602, 604 feed parallel correlators 132, 134, respectively, via mixers 423, 425, respectively. Mixers 423, 425 may couple the burst sequential memory to parallel correlator 420 as shown, or, alternatively, mixers 423, 425 can be moved to couple parallel correlators 132, 134 and integrator 138, similar to mixers 323, 325 in FIG. 3. The in-phase and quadrature components of the signal sequence in burst sequential memories 602, 604 may be shifted by shift registers 122, 124, or the in-phase and quadrature components of the signal sequence may remain static while the in-phase component of the predetermined pattern sequence in PN code memory bank 136 can be shifted by a shift register (not shown in FIG. 6 but similar to shift register 524 in FIG. 5) coupled to PN code memory bank 136.

Integrator 138 in geographic positioning receiver 600 can also operate in a longer than 1 bit time coherent mode. Recall that the GPS satellites transmit a 50 bps data sequence that is bi-phase modulated on top of the 1,023-bit long PN code sequence, also bi-phase modulated onto the signal. One data bit is transmitted every 20 repetitions of the PN code sequence, causing a 180 degree phase shift in the signal. Coherently integrating across a data bit transition of the fifty bit per second data sequence will cause the coherent integration sum to be reduced due to interference by the 180 degree reversal. It is possible to know a-priori the 50 bit per second sequence and to use the known data transition time to coherently integrate across multiple data bits in a process called data aiding. Precise or nearly precise knowledge of time is required, and a system as described in U.S. Pat. No. 5,893,044 (King and Ogren) can be employed to give the GPS sensor this sufficiently accurate time to be able to predict some segments of the 50 bps data pattern. For example, the time of arrival of a fixed 8-bit preamble word as transmitted by the satellites is predictable with time, as is a 17-bit TOW (time of week) field. The 17-bit TOW word is itself predictable as a function of time. Thus, there exists several segments of the 50 bps GPS navigation data message that are predictable with time and thus are known by the receiver. These bits, and others, can be used to coherently integrate across multiple data bits, thus greatly lowering the signal level at which signal detection occurs and giving the receiver a method of precisely time tagging the time of arrival of particular sequence of data bits. This longer than 1 bit time coherent mode of integrator 138 is explained with reference to FIG. 2. The correlation sums for a first one of the signal sequences are stored in memories 206 and 208, as explained previously for the non-coherent mode. Microprocessor 112 (FIG. 6) sends a known or predetermined M-bit sequence to shift register 216 via node 299. The M-bit sequence of data correspond to the known a-priori fifty bit per second data sequence that is captured in samples memory. This M-bit sequence is the M known bits as transmitted by a desired satellite. Sequencer 126 (FIG. 6) sends a clock signal to shift register 216 via a node 298 to shift the M-bit sequence in shift register 216. Shift register 216 first outputs the first bit of the M-bit sequence to both of mixers 218, 220.

Mixer 218 mixes the first bit of the M-bit sequence with each of the correlation sums for the in-phase component of the first signal sequence stored in memory 206. Mixer 218 sends each of these mixed correlation sums through multiplexer 226 and adder 228 to be stored in a different address within memory 230. Similarly, mixer 220 mixes the first bit of the M-bit sequence with each of the correlation sums for the quadrature component of the first signal sequence stored in memory 208. Mixer 220 sends each of the correlation sums from memory 208 through adder 222 to be stored in a different address in a memory 224. Accordingly, each of memories 230, 224 contain 2,046 correlation sums that have been mixed with the first bit of the M-bit shifted signal sequence in shift register 216.

Next, sequencer 126 (FIG. 6) sends a signal to shift register 216 via node 298 to have shift register 216 output the second bit of the M-bit sequence. This second bit is sent to mixers 218, 220. Mixers 218, 220 mix this second bit with the correlation sums stored in memories 206, 208. The mixed correlation sums are added to the mixed correlation sums previously stored in memories 230, 224, and the resulting sums are saved in memories 230, 224. For example, the correlation sum stored in the first address of memory 206, which represents the in-phase correlation sum of the zero-bit shifted signal sequence, is mixed with the second bit of the M-bit sequence in mixer 220 and is added to the existing mixed in-phase correlation sum stored in the first address of memory 230 in adder 228, and the resulting sum is stored in the first address of memory 230. This process is repeated until each of the bits of the M-bit sequence in shift register 216 is mixed with each of the correlation sums in memories 206, 208 and is added to the mixed correlation sums already stored in memories 224, 230. Afterwards, the second signal sequence stored in memories 602, 604 (FIG. 6) is processed in the same manner with the resulting mixed correlation sums added to the existing mixed correlation sums in memories 224, 230 and stored in memories 224, 230. Each of the signal sequences stored in memories 602, 604 (FIG. 6) is processed in the same manner.

Afterwards, memories 224, 230 output their correlation sums through adders 222, 228, respectively, to multiplexers 212, 210, respectively. Magnitude component 214 calculates the magnitude-squares of each of the 2,046 mixed correlation sums and sends the magnitude-squares to comparator 238 and adder 234 via multiplexer 232. Comparator 238 outputs the largest magnitude-squares and its associated memory address to microprocessor 112 (FIG. 6) via nodes 293 and 294, respectively. Adder 234 and register 236 calculate the sum of all of the magnitude-squares and outputs this sum to microprocessor 112 (FIG. 6) via node 292.

Figure 7:
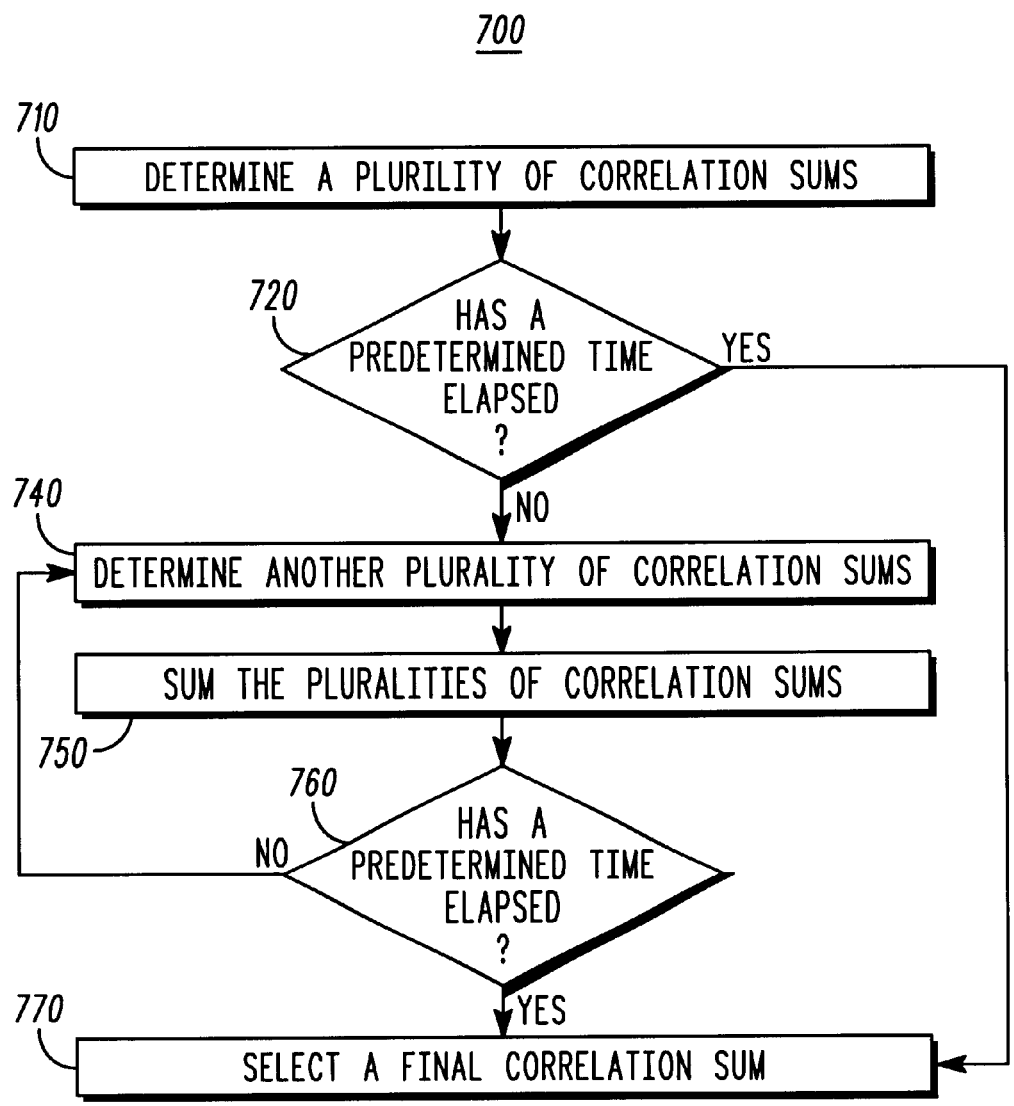
FIGS. 7 through 10 illustrate flowcharts of a method to acquire position coordinates in accordance with an embodiment of the invention.

FIG. 7 illustrates a flowchart of a method 700 of acquiring position coordinates in accordance with an embodiment of the invention. In FIG. 7, the method 700 of acquiring signal code phases, operates in real time and can be performed by receivers 100 (FIG. 1), 300 (FIG. 3), 400 (FIG. 4), and 500 (FIG. 5). Method 700 includes determining a plurality of correlation sums at a step 710. The process of step 710 is explained in more detail with reference to FIGS. 8, 9, and 10.

At a step 720 in FIG. 7, the duration of step 710 is compared to a predetermined time. Alternately, the duration can be dynamic and based on the detected signal achieving a particular signal to noise ratio. If the duration of step 710 is greater than or equal to the predetermined time, then the predetermined time has elapsed during step 710. Under this condition, method 700 continues by selecting a final correlation sum from the plurality of correlation sums in a step 770. In the preferred embodiment, the correlation sum determined in step 710 with the largest magnitude or largest absolute value is selected as the final correlation sum in step 770. The correlation sum having the largest magnitude value will most likely have the highest signal-to-noise ratio. It is the address of the maximum correlation sum that determines the code phase of the received signal.

However, in step 720, if the duration of step 710 is determined to be less than the predetermined time, then the predetermined time has not elapsed during step 710. Under this condition, method 700 continues by determining another plurality of correlation sums in a step 740. The process of step 740 is similar to step 710 and is explained in more detail hereinafter with reference to FIGS. 8, 9, and 10. In a step 750 of FIG. 7, the plurality of correlation sums determined in step 710 are summed with the plurality of correlation sums determined in step 740 to create a new plurality of correlation sums.

Subsequently, at a step 760, the combined duration of steps 710, 720, 740, and 750 is compared to the predetermined time. If the combined duration of steps 710, 720, 740, and 750 is greater than or equal to the predetermined time, then the predetermined time has elapsed. Under this condition, method 700 continues by selecting a final correlation sum from the summed or new plurality of correlation sums in step 770.

Figure 8:
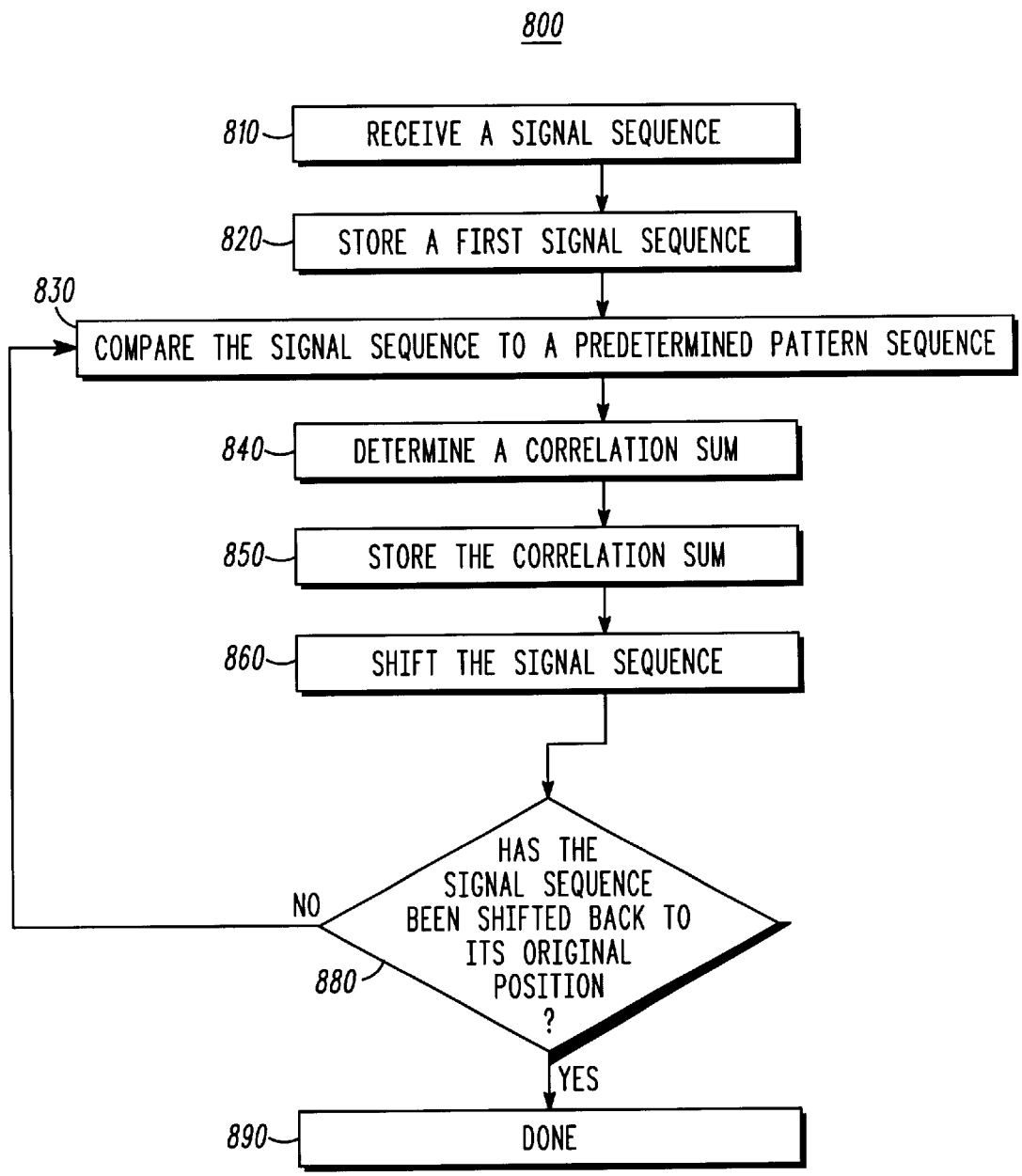

However, in step 760, if the combined duration of steps 710, 720, 740, and 750 is determined to be less than the predetermined time, then the predetermined time has not elapsed. Under this condition, method 700 continues by repeating step 740 to determine an additional plurality of correlation sums. Next, step 750 is repeated to sum the additional plurality of correlation sums with the plurality of correlation sums previously summed in the prior step 750 to create another new plurality of correlation sums. The repetition of steps 740 and 750 continues until step 760 determines that the predetermined time has elapsed at which time the final correlation sum is selected in step 770. The final correlation sum with the greatest magnitude is selected, its address in memory corresponding to the code phase of the received signal. The detection criteria described in step 720 and 760 is described as a particular interval of time. As mentioned earlier, it is possible for the detection criteria to be based alternately on the detected signal achieving a particular signal to noise value within a prescribed interval of time. FIG. 8 provides a more detailed illustration of a method 800 of determining a plurality of correlation sums. Method 800 is similar to steps 710 and 740 in FIG. 7. At a step 810 of FIG. 8, a signal sequence is received. The signal sequence is then stored at a step 820. The signal sequence is then compared to a predetermined PN pattern sequence at a step 830. The process of step 830 is described in further detail in FIG. 9. At a step 840 in FIG. 8, a correlation sum is determined from the comparison of the signal sequence and the predetermined pattern sequence. The process of step 840 is described in further detail in FIG. 10. At a step 850 in FIG. 8, the correlation sum is then stored.

The signal sequence is then shifted by one sample at a step 860. Subsequently, at a step 880, the shifted signal sequence is checked to verify whether the signal sequence has been shifted to its original position. This checking process can be accomplished by using a counter that is reset to zero upon performing step 810 and that is incremented by one each time step 860 is performed. Once the counter reaches a predetermined value, indicating that the signal sequence has been shifted to its original position, then the method 800 is completed at a step 890. In the preferred embodiment, the predetermined value is 2046, representing the total number of half-chip samples in the signal sequence.

However, if the counter has not reached the predetermined value, then steps 830, 840, and 850 are repeated to compare the shifted signal sequence to the predetermined pattern sequence, determine a correlation sum from the comparison of the shifted signal sequence to the predetermined pattern sequence, and then store the correlation sum, respectively. Alternately, the predetermined pattern sequence can be shifted while the signal sequence remains unshifted.

The shifted signal sequence is then shifted again by one more sample in step 860. Next, step 880 is repeated, and method 800 either terminates at step 890 or continues to repeat steps 830, 840, 850, 860, and 880 until the signal sequence is shifted back to its original position.

Figure 9:
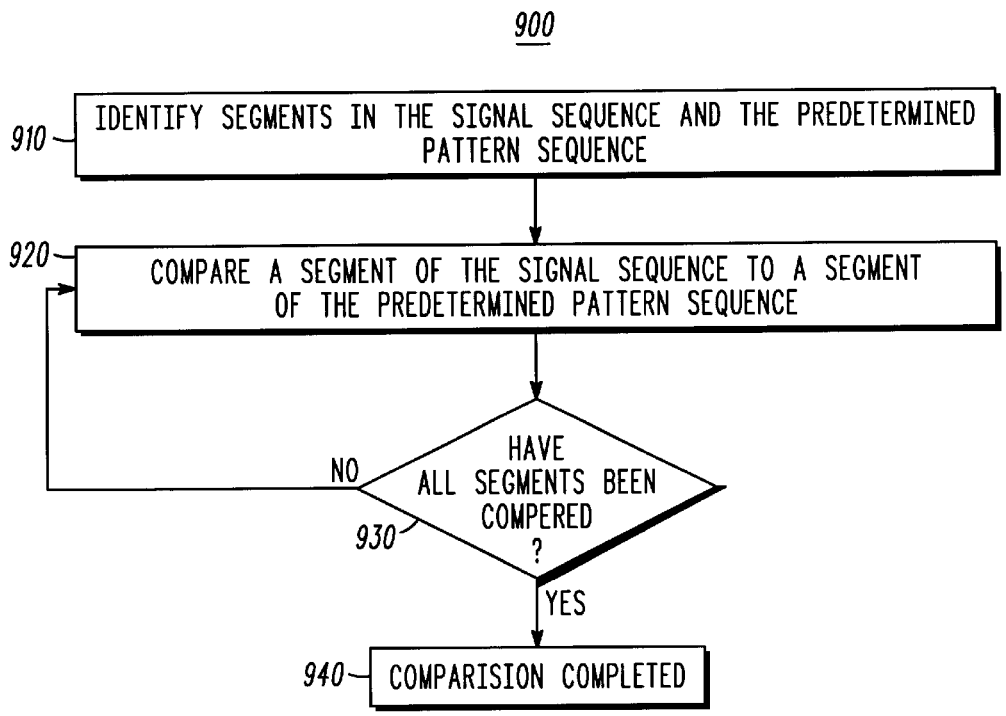

FIG. 9 is a more detailed explanation of comparing the signal sequence to the predetermined pattern sequence in step 830 of FIG. 8. At a step 910 in FIG. 9, a plurality of segments, or words, in the signal sequence and in the predetermined pattern sequence are identified. In the preferred embodiment, the signal sequence and the predetermined pattern sequence are each comprised of 16 segments, and each segment is comprised of 128 samples. Then, at a step 920, a first segment of the signal sequence is compared to a first segment of the predetermined pattern sequence. The comparison of the first segment of the signal sequence and the first segment of the predetermined pattern sequence includes comparing the first sample of the first segment of the signal sequence to the first sample of the first segment of the predetermined pattern sequence, comparing the second sample of the first segment of the signal sequence to the second sample of the first segment of the predetermined pattern sequence, and so on. Next, at a step 930, a determination is made as to whether all segments of the signal sequence and predetermined pattern sequence have been compared. If segments of the signal sequence have not yet been compared to the predetermined pattern sequence, then step 920 is repeated. During the first time that step 920 is repeated, a second segment of the signal sequence is compared to a second segment of the predetermined pattern sequence. The comparison of the second segments is performed sample-by-sample in a manner similar to that described for the comparison of the first segments. However, if step 930 determines that all segments of the signal sequence and predetermined pattern sequence have been compared, then the comparison is completed at a step 940.

Figure 10:
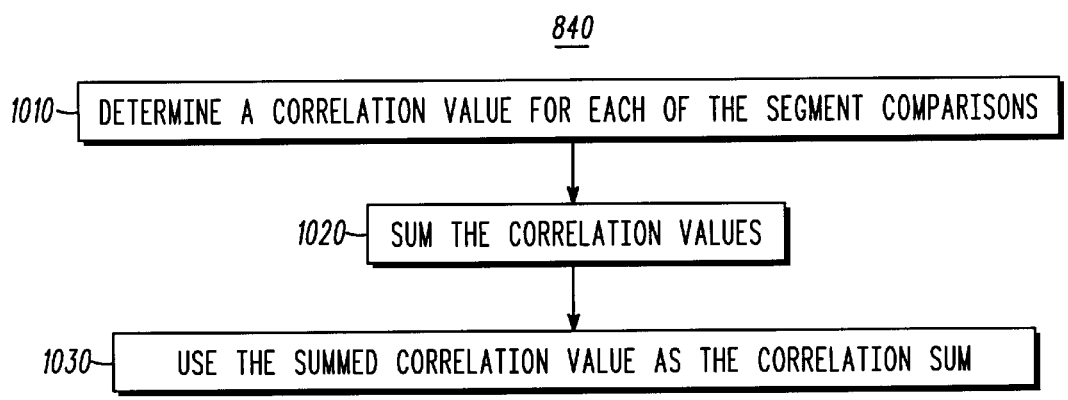

FIG. 10 is a more detailed explanation of determining a correlation sum in step 840 of FIG. 8. At a step 1010 in FIG. 10, a correlation value is determined for each of the segment comparisons performed in step 920 of FIG. 9. At a step 1020 in FIG. 10, the correlation value for each segment in the signal sequence is summed into a total correlation value, and at a step 1030, the total correlation value is used as the correlation sum described in step 840 of FIG. 8.

It is understood that the sequence of the substeps in steps 830 and 840 of FIG. 8, as described with reference to FIGS. 9 and 10, can be mixed together. For example, step 1010 and step 1020 (FIG. 10) can be performed between steps 920 and 930 (FIG. 9), and step 1030 (FIG. 10) can be performed between steps 930 and 940 (FIG. 9). In this embodiment, steps 830 and 840 (FIG. 8) are combined such that a correlation value for a segment comparison is determined after comparing the segment of a signal sequence but before determining whether all segments have been compared and before comparing the next segments of the same signal sequence.

Although certain specific embodiments have been described herein, it will be apparent to those skilled in the art that variations and modifications of such embodiments contained hereinbefore may be made without departing from the spirit and scope of the invention. Accordingly, it is intended that the invention shall be limited only to the extent required by the appended claims.

What is claimed is:

1. A method of acquiring signal code phases in a geographic positioning receiver comprising the steps of:
providing a memory with at least three portions, a correlator with an adder coupled thereto, and a comparator, microprocessor, mixer, and a numerically controlled oscillator coupled to each other and the memory, and providing a predetermined pattern sequence;
receiving a first signal sequence;
storing the fist signal sequence in a first memory portion and storing the predetermined pattern sequence in a second memory portion;
comparing the first signal sequence and the predetermined pattern sequence in the correlator;
generating correlation values;
adding the correlation values from the correlator into correlation sums in the adder;
storing the correlation sums from the adder in a third memory portion;
selecting by the comparator from the third memory portion a final correlation sum with a greatest magnitude from the correlation sums; and
determining a code phase for the first signal sequence from the final correlation sum.

2. The method of claim 1 wherein the predetermined pattern sequence of the providing step includes a first plurality of segments, and further comprising the steps of:
providing a plurality of samples within each of the first and second pluralities of segments;
identifying a second plurality of segments in the first signal sequence;
wherein the comparing step includes comparing the second plurality of segments to the first plurality of segments, and further comprising the step of:
determining a first and a second correlation sum for the first signal sequence and the predetermined pattern sequence.

3. The method of claim 1 further comprising the steps of:
storing the first signal sequence at a first address in the first memory portion;
storing the first correlation sum at a first address in the second memory portion; and
storing the second correlation sum at a second address in the second memory.

4. The method of claim 2, wherein the comparing step comprises:
comparing a first one of the second plurality of segments to a first one of the first plurality of segments; and
comparing a second one of the second plurality of segments to a second one of the first plurality of segments.

5. The method of claim 4 wherein the step of comparing the first one of the second plurality of segments comprises:
comparing a first sample of the first one of the second plurality of segments to a first sample of the first one of the first plurality of segments; and comparing a second sample of the first one of the second plurality of segments to a second sample of the first one of the first plurality of segments; and wherein the step of comparing the second one of the second plurality of segments comprises:

comparing a first sample of the second one of the second plurality of segments to a first sample of the second one of the first plurality of segments; and comparing a second sample of the second one of the second plurality of segments to a second sample of the second one of the first plurality or segments.

6. The method of claim 2 wherein the step of determining the first correlation sum comprises:

determining a first correlation value by comparing a first one of the second plurality of segments to a first one of the first plurality of segments;

determining a second correlation value by comparing a second one of the second plurality or segments to a second one of the first plurality of segments; and summing the first correlation value and the second correlation value.

7. The method of claim 2 further comprising the steps of:

shifting the first signal sequence by one sample;

storing the first signal sequence shifted by one sample;

identifying a third plurality of segments in the first signal sequence shifted by one sample; and comparing the third plurality of segments to the first plurality of segments, wherein the step of determining the second correlation sum further comprises the step of:

determining the second correlation sum for the shifted first signal sequence shifted by one sample and the predetermined pattern sequence.

8. The method of claim 7 wherein the step of determining the first correlation sum further comprises the steps of:

determining a first correlation value by comparing a first one of the second plurality of segments to a first one of the first plurality of segments;

determining a second correlation value by comparing a second one of the second plurality of segments to a second one of the first plurality of segments; and summing the first correlation value and the second correlation value; and wherein the step of determining the second correlation sum further comprises the steps of:

determining a third correlation value by comparing a first one of the third plurality of segments to a first one of the first plurality of segments;

determining a fourth correlation value by comparing a second one of the third plurality or segments to a second one of first the plurality of segments; and summing the third correlation value and the fourth correlation value.

9. The method of claim 8 wherein the selecting step further comprises the steps of:

determining a magnitude of the first correlation sum;

storing the magnitude of the first correlation sum at a first memory address;

determining a magnitude of the second correlation sum;

storing the magnitude of the second correlation sum at a second memory address;

comparing the magnitude of the first and second correlation sums;

selecting the first correlation sum if the magnitude of the first correlation sum is larger than the magnitude of the second correlation sum; and selecting the second correlation sum if the magnitude of the second correlation sum is larger than the magnitude of the first correlation sum.

10. The method of claim 9 wherein the step of determining the code phase further comprises determining the code phase from a memory address for the magnitude of the final correlation sum.

11. The method of claim 10 further comprising the step of:

storing the first signal sequence at least until completion of one of selecting the first correlation sum and selecting the second correlation sum.

12. The method of claim 2 further comprising the steps of:

storing the first correlation sum;

storing the second correlation sum;

receiving a second signal sequence;

storing the second signal sequence;

identifying a fourth plurality of segments in the second signal sequence;

comparing the fourth plurality of segments to the first plurality of segments;

determining a third correlation sum for the second signal sequence and the predetermined pattern sequence;

storing the third correlation sum;

determining a fourth correlation sum for the second signal sequence and the predetermined pattern sequence; and storing the fourth correlation sum.

13. The method of claim 12 further comprising the steps of:

shifting the first signal sequence by one sample;

storing the first signal sequence shifted by one sample;

identifying a third plurality of segments in the first signal sequence shifted by one sample;

comparing the third plurality of segments to the first plurality of segments;

shifting the second signal sequence by one sample;

storing the second signal sequence shifted by one sample;

identifying a fifth plurality of segments in the second signal sequence shifted by one sample; and comparing the fifth plurality of segments to the first plurality of segments;

wherein the step of determining the second correlation sum further comprises determining the second correlation sum for the first signal sequence shifted by one sample and the predetermined pattern sequence.

14. The method of claim 13 further comprising the steps of:

increasing the first correlation sum by adding the third correlation sum to the first correlation sum; and increasing the second correlation sum by adding the fourth correlation sum to the second correlation sum.

15. The method of claim 14 wherein the step of selecting the final correlation sum occurs after the increasing steps.

16. The method of claim 2 further comprising the steps of:

shifting the predetermined pattern sequence by one sample;

identifying a third plurality of segments in the predetermined pattern sequence shifted by one sample;

comparing the second plurality of segments to the third plurality of segments; and storing the second correlation sum, wherein the step of determining the second correlation sum further comprises determining the second correlation sum for the first signal sequence and the predetermined pattern sequence shifted by one sample.

17. The method of claim 16 wherein the step of determining the first correlation sum comprises:
   determining a first correlation value by comparing a first one of the second plurality of segments to a first one of the first plurality of segments;
   determining a second correlation value by comparing a second one of the second plurality of segments to a second one of the first plurality of segments; and
   summing the first correlation value and the second correlation value; and the step of determining the second correlation sum comprises:
      determining a third correlation value by comparing a first one of the second plurality of segments to a first one of the third plurality of segments;
      determining a fourth correlation value by comparing a second one of the second plurality of segments to a second one of the third plurality of segments; and
      summing the third correlation value and the fourth correlation value.

18. The method of claim 17 wherein the selecting step comprises:
   determining a magnitude of the first correlation sum;
   storing the magnitude of the first correlation sum at a first memory address;
   determining a magnitude of the second correlation sum;
   storing the magnitude of the second correlation sum at a second memory address;
   comparing the magnitudes of the first and second correlation sums;
   selecting the first correlation sum if the magnitude of the first correlation sum is larger than the magnitude of the second correlation sum; and
   selecting the second correlation sum if the magnitude of the second correlation sum is larger than the magnitude of the first correlation sum; and
   determining the code phase further comprises determining the code phase from a memory address for the magnitude of the final correlation sum.

19. The method of claim 2 wherein each of the comparing and determining steps are performed in a real time mode.

20. The method of claim 2 further comprising the steps of:
   receiving a second signal sequence;
   storing the second signal sequence; and
   performing the comparing and determining steps while receiving and storing the second signal sequence.

21. The method of claim 2 further comprising the step of:
   tuning to a frequency in the first signal sequence.

22. The method of claim 21 further comprising the step of:
   performing the tuning step before storing the first signal sequence.

23. The method of claim 21 further comprising the step of:
   performing the tuning step after storing the first signal sequence and before comparing the second plurality of segments to the first plurality of segments.

24. The method of claim 21 further comprising the step of:
   performing the tuning step after comparing the second plurality of segments to the first plurality of segments and before determining the first correlation sum.

25. The method of claim 21 further comprising the step of:
   performing the selecting step after determining the first correlation sum and before storing the first correlation sum.

26. The method of claim 2 wherein the comparing and determining steps are performed in a static mode.

27. The method of claim 2 further comprising the steps of:
   turning on a down converter before receiving the first signal sequence;
   turning off the down converter after storing the first signal sequence; and
   keeping the down converter off during the comparing and determining steps.

28. A method of acquiring signal code phases comprising the steps of:
   providing a predetermined pattern sequence having a first plurality of segments;
   receiving a first signal sequence;
   storing the first signal sequence;
   identifying a second plurality of segments in the first signal sequence;
   comparing the second plurality of segments to the first plurality of segments;
   determining a first correlation sum from the first signal sequence and the predetermined pattern sequence;
   storing the first correlation sum at a first address in a first memory portion;
   shifting the first signal sequence by one sample to create a one-sample shifted first signal sequence;
   identifying a third plurality of segments in the one-sample shifted first signal sequence;
   comparing the third plurality of segments to the first plurality of segments;
   determining a second correlation sum for the one-sample shifted first signal sequence and the predetermined pattern sequence;
   storing the second correlation sum at a second address in the first memory portion;
   receiving a second signal sequence;
   storing the second signal sequence while comparing the second plurality of segments, determining the first correlation sum, storing the first correlation sum, shifting the first signal sequence, comparing the third plurality of segments, determining the second correlation sum, and storing the second correlation sum;
   identifying a fourth plurality of segments in the second signal sequence;
   comparing the fourth plurality of segments to the first plurality of segments;
   determining a third correlation sum from the second signal sequence and the predetermined pattern sequence;
   summing the third correlation sum and the first correlation sum to obtain a fourth correlation sum;
   storing the fourth correlation sum at the first address in the first memory portion;
   shifting the second signal sequence by one sample to create a one-sample shifted second signal sequence;
   identifying a fifth plurality of segments in the one-sample shifted second signal sequence;
   comparing the fifth plurality of segments to the first plurality of segments;
   determining a fifth correlation sum for the one-sample shifted second signal sequence and the predetermined pattern sequence;
   summing the fifth correlation sum and the second correlation sum to obtain a sixth correlation sum;

storing the sixth correlation sum at the second address in the first memory portion;

determining a magnitude of the fourth correlation sum;

storing the magnitude of the fourth correlation sum at a first address in a second memory portion;

determining a magnitude of the sixth correlation sum;

storing the magnitude of the sixth correlation sum at a second address in the second memory portion;

comparing the magnitude of the fourth and sixth correlation sums;

selecting a final correlation sum with a greatest magnitude from the fifth correlation sum and the sixth correlation sum if a predetermined time has elapsed; and determining a code phase for the first and second signal sequences from a memory address in the second memory portion for the magnitude of the final correlation sum.

29. A geographic positioning receiver comprising:

a first memory portion capable of storing a first signal sequence;

a second memory portion capable of storing a predetermined pattern sequence;

a correlator coupled to the first and second memory portions and capable of receiving and comparing the first signal sequence and the predetermined pattern sequence and generating correlation values;

an adder coupled to the correlator and capable of adding the correlation values into correlation sums;

a third memory portion coupled to the adder and capable of storing the correlation sums;

a comparator coupled to the third memory portion and capable of selecting one of the correlation sums having a largest magnitude;

a microprocessor;

a numerically controlled oscillator coupled to the microprocessor; and a mixer coupled to the numerically controlled oscillator and coupling the first memory portion to the comparator.

30. The geographic positioning receiver of claim 29 wherein the first and third memory portions are random access memory portions; and the second memory portion is a read-only memory portion.

31. The geographic positioning receiver of claim 30 further comprising a fourth memory portion coupled to the correlator and capable of storing a second signal sequence, wherein the fourth memory portion is a random access memory portion.

32. The geographic positioning receiver of claim 31 further comprising a multiplexer coupling the first and fourth memory portions to the correlator.

33. The geographic positioning receiver of claim 29 further comprising:

an analog-to-digital converter coupled to the first memory portion;

a down converter coupled to the analog-to-digital converter; and an antenna coupled to the down converter.

34. The geographic positioning receiver of claim 33 wherein the mixer couples the analog-to-digital converter to the first memory portion; and further comprising a correlator coupled to the mixer and capable of providing the numerically controlled oscillator input to the mixer.

35. The geographic positioning receiver of claim 29 wherein the mixer couples to the numerically controlled oscillator and coupling the comparator to the adder.

36. The geographic positioning receiver of claim 29 further comprising a shift register coupled to the first memory portion.

37. The geographic positioning receiver of claim 29 further comprising a shift register coupled to the second memory portion.

38. The geographic positioning receiver of claim 29 wherein the first memory portion is a burst sequential memory portion.

* * * * *